US000001034H

United States Statutory Invention Registration [19]

[11] Reg. Number: H1034

Lohrmann

[43] Published: Mar. 3, 1992

[54] MILLIMETER WAVE TRACKING RADAR ANTENNA WITH VARIABLE AZIMUTH PATTERN

[75] Inventor: Dieter Lohrmann, Waldorf, Md.

[73] Assignee: United States of America, Washington, D.C.

[21] Appl. No.: 635,020

[22] Filed: Dec. 28, 1990

[51] Int. Cl.[5] ..... H01Q 13/00

[52] U.S. Cl. ..... 343/781 LA; 343/781 R

*Primary Examiner*—Bernarr E. Gregory

*Attorney, Agent, or Firm*—Thomas E. McDonnell; Edward F. Miles

[57] ABSTRACT

A millimeter wave Cassegrain antenna for a seeker missile wherein a sub-reflector has two side portions which can be masked in order to widen the antenna's azimuth beam width without widening the elevation pattern. The side portions of the sub-reflector are masked by a radar absorbing material which is disposed in a masking position as the missile approaches its target.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MILLIMETER WAVE TRACKING RADAR ANTENNA WITH VARIABLE AZIMUTH PATTERN

FIELD OF THE INVENTION

The present invention relates generally to a Cassegrain-type antennas for guided or seeker missiles, and in particular, to Cassegrain-type antennas having an azimuth beam width which is adjusted depending on the range of the missile from a target.

BACKGROUND OF THE INVENTION

Millimeter wave Cassegrain-type antennas have many applications. In particular, these antennas are used in tracking radar systems for guided or seeker missiles. Such antennae tend to have quite narrow beam widths in comparison to L or X band radars. For example, a 30 cm diameter antenna operated at 94 GHz ($\lambda=3.2$ mm) typically has a beam width of 0.7° as compared to 7° for an X band antenna of equal diameter. Such a narrow beam width is desirable from the standpoint of electronic counter measures (ECM) and power requirements, since relatively low power is required for long range sensing and the antenna signal is relatively immune to jamming.

However, while conventional Cassegrain-type antennas work well for long ranges, at close range (less than three miles), the narrow beam width of the antenna signal illuminates only a small part of a large target, such as a ship. For example, with a 0.7° beam, only a 12 m diameter patch is illuminated at a distance of 1 km. Since a target like an aircraft carrier may be 300 m long, the aimpoint of a monopulse seeker system tends to wander and will lock on the bow or stern of a ship unless a strong and stable reflector is found at an intermediate location. This is not desirable in terms of the effectiveness of a missile in destroying targets. Because a target like an aircraft carrier is much larger in azimuth than elevation, it would be advantageous to have a radar beam width which is much narrower in azimuth than elevation.

Several methods have been developed for selectively varying the beam width of antennas. For example, U.S. Pat. No. 3,866,233 to Schmidt discloses Cassegrain and Gregorian-configured dish antennas having a switchable beam width wherein a subreflector is effectively reduced in size by moving an annular outer portion out of focus position. The '233 patent antenna permits a narrow beam width antenna to be switched to a wide beam width configuration, initially, in order to acquire a transmitting station it is seeking. Then, once the station has been acquired, the antenna is switched back to its narrow beam width configuration for normal operation. This antenna is useful for a satellite communications system wherein a antenna must track a small object which is always at the same long distance range away from the antenna. Schmidt's antenna also reduces the entire radius of the sub-reflector or reflector which in turn widens both the elevation (vertical) and the azimuth (horizontal) characteristics of the antenna. This is not desirable for a missile because the missile needs to retain the azimuth pattern in order to effectively track a target. Also, the Schmidt antenna would be too bulky to be used in a missile system.

Other examples include U.S. Pat. No. 3,938,162 to Schmidt, which discloses a variable beam width antenna in which the azimuth and elevation beam widths are independently adjustable by cylinder-parabol reflectors at right angles which can be telescoped; U.S. Pat. No. 2,408,373, which discloses an antenna having a main reflector with hinged sections that can be tilted to adjust the beam width; U.S. Pat. No. 3,254,342 to Miller, which discloses a variable beam width Cassegrain antenna having a subreflector made of an elastic material, the shape of which is varied to control the aperture area; and U.S. Pat. Nos. 4,253,100 to Commault et al. and 4,612,550 to Brucker et al., which disclose an inverse Cassegrain antenna having a hinged subreflector for changing the effective area of the subreflector. These prior art variable beam width antennas are either too bulky for use in missile systems; vary both the azimuth and elevation beam width, which is inappropriate for missile tracking radar systems; or require the use of mechanically moveable parts, which at the millimeter wavelength range requires extremely high precision. Such mechanical systems are further sensitive to the substantial shock and vibration conditions to which missile systems are subjected. Subreflectors which have displacable parts are also subject to spurious reflections from any of the displaced parts.

SUMMARY OF THE INVENTION

It is accordingly a principal object of the present invention to overcome the aforementioned disadvantages of the prior art.

This and other objects and advantages are achieved in accordance with the present invention by providing a Cassegrain antenna with a subreflector in which only vertical side portions of a subreflector are moveable.

In accordance with a further aspect of the present invention, fixed vertical side portions of a subreflector are selectively masked with a radar absorbing material.

These and other features and advantages of the present invention are disclosed in or apparent from the following detailed description of preferred embodiments.

BRIEF DESCRIPTION OF THE DRAWINGS

The preferred embodiments are described with reference to the drawings, wherein like elements are denoted with like reference numerals throughout the figures, and wherein.

DETAILED DESCRIPTION OF THE PREFERRED EMBODIMENT

Figure 1:
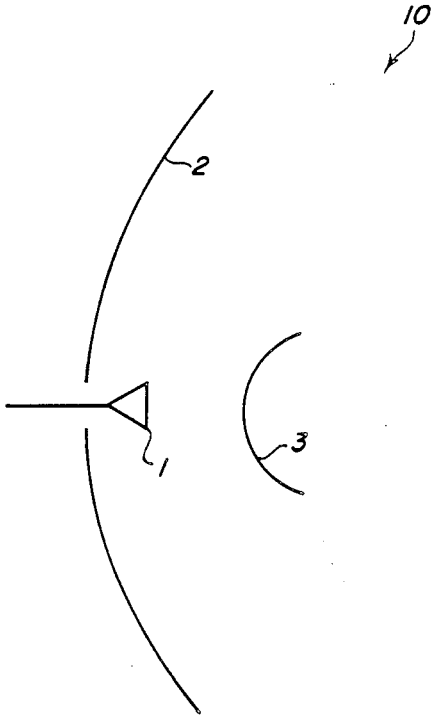
PRIOR ART FIG. 1
FIG. 1 is a diagrammatic side view of a conventional Cassegrain antenna.
Figure 2:
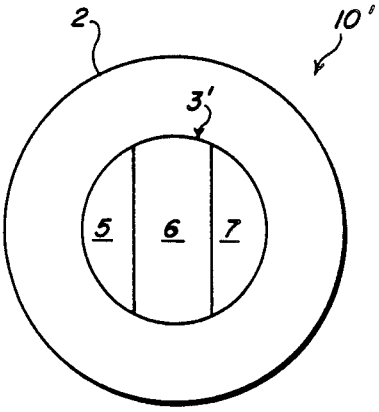
FIG. 2 is a diagrammatic front view of a first embodiment of a Cassegrain antenna constructed in accordance with the present invention.
Figure 3:
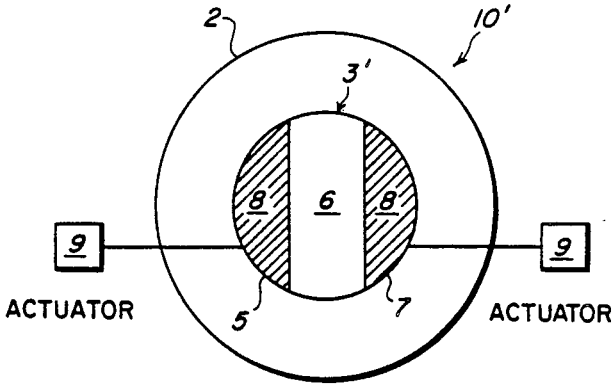
FIG. 3 is a diagrammatic front view of the sub-reflector of a second embodiment of a Cassegrain antenna constructed in accordance with the present invention.

A conventional Parabol-Cassegrain antenna 10, as shown in FIG. 1, has a feed horn 1, a main reflector 2 and a sub-reflector 3. Radar waves are emitted by feed horn 1, bounce off the sub-reflector 3, and then off the main reflector 2 and out to the target. As shown in FIGS. 2 and 3, in accordance with the present invention, sub-reflector 3' comprises two vertical side sections 5 and 7, and a central or intermediate section 6. In one embodiment (FIG. 2), side sections 5 and 7 are moveable in a conventional fashion to reduce the effective area of reflector 3' so as to widen the beam width in the azimuth direction only. In a second embodiment (FIG. 3), a mask 8 of radar absorbing material is disposed in front of each side section 5 and 7. Each mask 8 has a variable configuration so as to cover selected vertical slice portions of the underlying side section 5, 7 of reflector 3; and actuators 9 responsive to control signals are provided for varying the configurations of masks 8 so as to control the degree of azimuthal beam width widening.

It will be appreciated by those skilled in the art that reflector 3 can also be configured so that the entire reflector can be displaced or masked at very close ranges to provide maximum beam width widening. This can reduce the aperture area of the antenna by as much as a factor of 1000, and can increase the antenna beam width by as much as a factor of 30. Such a drastic reduction in aperture area also reduces the antenna's gain by a factor of 1000, but at close range, the returning signals from the target should be strong enough for adequate processing.

The foregoing description of preferred embodiments is intended to be illustrative and not limiting. It will thus be appreciated that substantial modifications and variations can be made without departing from the spirit and scope of the present invention.

What is claimed is:

1. A millimeter wave seeker missile Cassegrain antenna for generating and receiving millimeter wave radar pulses wherein said antenna beam width is widened as the missile approaches a target, said antenna comprising:

a main reflecting dish;

a sub-reflector dish being divided vertically into a center portion and two side portions;

masking means for selectively masking said side portions in order to widen the azimuth pattern beam width of said antenna.

2. The antenna of claim 1, wherein said masking means comprises a radar absorbing material.

3. The antenna of claim 1, wherein said antenna comprises means for removing said subreflector dish in order to use the feedhorn of said antenna as the main radiating element.

* * * * *